Aug. 28, 1934.  H. D. YODER  1,971,438
UNIVERSAL ADAPTER
Filed Sept. 29, 1932
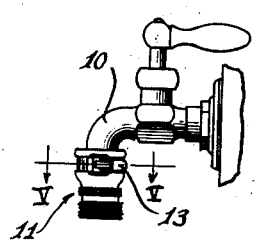
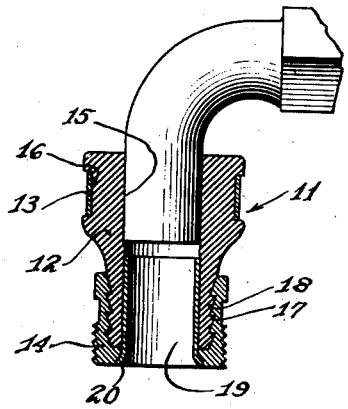
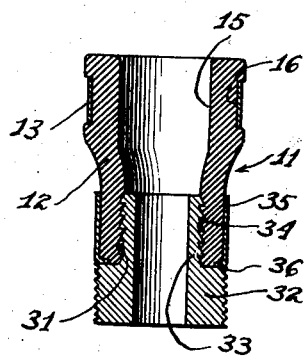
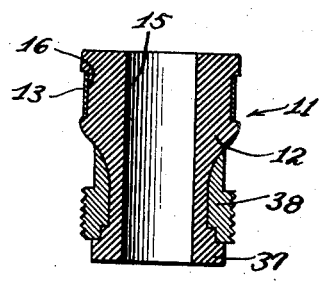
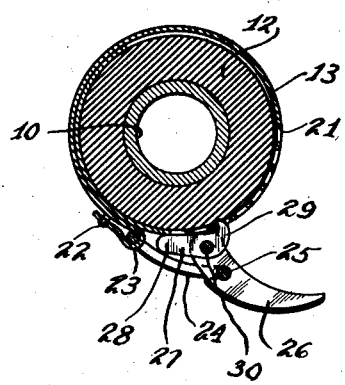
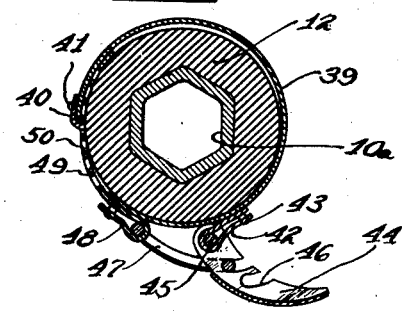
Inventor
Howard D Yoder Patented Aug. 28, 1934

1,971,438

UNITED STATES PATENT OFFICE 1,971,438

UNIVERSAL ADAPTER

Howard D. Yoder, Detroit, Mich., assignor to Penberthy Injector Company, Detroit, Mich., a corporation of Delaware Application September 29, 1932, Serial No. 635,381

1 Claim. (Cl. 285—164)

This invention relates to a universal adapter or connecting piece for connecting pipes, hoses and other tubes to members such as faucets having smooth faces thereon.

It is the principal purpose of this invention to provide a connecting piece which has such flexibility that it will fit a faucet having smooth round faces but having various diameters and which will also fit faucets having polygonal cross-section.

To this end, it is an object of this invention to provide a connecting member for uniting hoses and the like to faucets which has sufficient flexibility to insure a watertight joint.

It is also an object of this invention to provide a connecting piece or adapter having adjustable means thereon so that the adapter may be applied to faucets of various diameters.

It is a still further object of this invention to provide a connecting piece for faucets which serves to provide smooth end faucets with threaded members for receiving pipes and hoses.

It is a particular object of this invention to provide a flexible member having a bore therethrough the diameter of which can be adjusted by means thereon and which is provided at one end thereof with an outside threaded portion for receiving another threaded member.

These and other objects of this invention will be apparent from the following description and appended claim.

This invention (in a preferred form) is illustrated in the accompanying drawing and hereinafter more fully described.

On the drawing:

Figure 1 is an elevational view of an adapter embodying my invention shown applied to a faucet.

Figure 2 is a longitudinal sectional view of the adapter of Figure 1 with the faucet shown therein in elevation.

Figures 3 and 4 are longitudinal sectional views of modified forms of the adapter.

Figure 5 is an enlarged sectional view taken on the line V—V of Figure 1 and

Figure 6 is a sectional view similar to Figure 5 but showing a modified form of adjusting means, and also showing the adapter applied to a faucet of slightly different contour.

As shown on the drawing:

The adapter of my invention is illustrated generally by the reference numeral 11 and is shown in Figure 1 as applied to a faucet 10. The adapter 11 comprises a flexible body 12, an adjustable strap 13 and a threaded end member 14.

The flexible body 12 is preferably made of rubber and is provided with a cylindrical bore 15 therethrough. Near the upper outside end of the body 12 an annular groove 16 is formed thereon for receiving and locating the adjusting band 13. The lower outside portion of the flexible body member 12 is provided with a number of serrations or teeth 18 which fit corresponding teeth 17 in the end member 14 to hold the latter member in place.

A sleeve 19 is forced into the lower end of the body 12 and has its end 20 curled against the member 14 to securely hold it in place. The sleeve 19 may be welded to the member 14. The sleeve 19 serves to hold the flexible body 12 against the threaded member 14 and so keeps the teeth 17 and 18 in contact to insure against the slipping off of the end member 14.

Referring particularly to Figure 5, it will be seen that the flexible strap 13 in the preferred form of the invention comprises a sheet metal band having a number of apertures 21 through one end portion thereof. The other end of the strap is curled over and riveted to itself at 22 to provide a loop 23 which receives a wire 24. The ends of the wire 24 are received in apertures 25 in a curved handle piece 26.

A pawl 27 having a weighted end 28 and a toothed end 29 is pivoted to the inner end of the handle 26, as by the pin 30. The tooth end 29 of the pawl is adapted to fit into any one of the recesses 21 in the band 13.

Figures 3 and 4 illustrate modifications of my invention. As shown in Figure 3, the flexible body 12 is provided with teeth 31 in the lower inside thereof. In this case, a threaded end member 32 is provided having a throat or extension 33 which fits inside the flexible body and is provided with teeth 34 adapted to be meshed with the teeth 31 of the flexible body 12. An annular metal band 35 is pressed about the outside of the lower end of the flexible member 12 to maintain the teeth 34 and 31 in meshed relation. This band 35 may have its lower ends inturned to form an annular flange 36 for securely holding it in place on the flexible body 12.

As shown in Figure 4, the flexible body 12 is elongated and provided with an external annular flange as shown at 37. An annular metal threaded member 38 is fitted about the body 12 just above the flange 37 to serve as the securing means upon which a pipe or hose or other similar member may be threaded. This construction is of a very simple nature and, moreover, has a distinct advantage in use, as the flange 37 on the flexible member serves as a washer when uniting the adapter 11 to a hose, pipe or similar member.

Figure 6 illustrates the adaption of the connecting piece of this invention to a faucet 10ª having a hexagonal outer contour. Moreover, this figure also illustrates a modified type of adjusting strap. In this case, a thin, flexible metal band 39 is provided in the annular groove 16 of the flexible body 12. The band 39 is provided with a toothed member 40 riveted to one end thereof as shown at 41. Adjacent the other end of the band, a loop of metal 42 is riveted as at 43.

A curved handle 44 is provided and has its inner end pivoted to the loop 42 as by a pintle 45. The handle 44 is provided with a series of notches 46 which receive a wire 47. The other ends of the wire 47 are received in a loop 48 in a band member 49. The band member 49 is provided with a series of notches 50 adapted to receive the toothed member 40 on the band 39.

In operation, using the form of adapter shown in Figure 5, a hose or pipe is threaded onto the end members 14, 32 or 38 and the flexible body member is placed over the end of a faucet. Next, the band member 13 is drawn tightly about the flexible body member 12 and the pawl member 29 is placed in one of the notches 21. The band is then drawn into a snug position by movement of the lever or handle 26 toward the band. It will be seen that this movement gives a takeup on the band substantially equal to the distance between the pin 30 and the aperture 25 on the handle. When the handle is in clamped position the pivot points 24 and 25 are on the same side of pin 30 and thus there is no tendency for the clamp to pull away from the band.

The modified form of adjusting means shown in Figure 6 operates also in the manner just described. However, it will be noted that in this modified form, two adjustments are given, one by the series of notches 50 on the bands 49 and the other by the series of notches 46 on the handle 44. In using both of these adjustments, a very fine adjustment is given which insures a non-leak contact between the adapter and the faucet to which it is applied.

The specific embodiments of my invention shown herein are for illustrative purposes only and are in no way intended to be construed as limitations on this invention. Any changes in the design or construction of the parts, as well as in the relationships between the parts, may be made without departing from the spirit and scope of this invention. For example, it is contemplated that in carrying out this invention a single band without notches may be used and the adjustment given by a series of notches similar to the notches 46 in the handle 44. Also, it is not necessary to use a sheet metal band, as a chain or wire may be used in place thereof. Further, the flexible body of the adapter member may be cased in a rigid member. My invention also contemplates the construction in which a part of the adapter member is formed integral with a hose or other member adapted to be secured to a faucet.

Preferably the body 12 of the adapter is made of rubber and the threaded members and sleeves are made of metal. However, it will be understood that these latter parts may be made of resinous condensation products, hard rubber or similar material.

It will be seen from the above description of this invention that I have provided a handy connecting member which insures a watertight joint between a hose or pipe and a faucet. Moreover, it provides a connecting member which can be used with faucets of different sizes or of different forms of external contour and yet insures a watertight joint with each.

I claim as my invention:

A connecting piece comprising a short flexible cylindrical member having a bore therethrough, and an outer annular recess adjacent one end, a threaded collar fitted on the other end of said flexible member, a sleeve pressed into the bore of the flexible member to hold said flexible member in engagement with said collar, a metal band provided with a series of apertures at one end thereof positioned in said annular recess, and a clamping means and pawl secured at the other end of said band, said pawl being engageable in said apertures to contract the bore of said flexible member.

HOWARD D. YODER.